UNITED STATES PATENT OFFICE.

JOHN A. SCHARWATH, OF CRANFORD, NEW JERSEY.

PROCESS OF PRODUCING HEAT-INSULATING MATERIAL.

1,092,402. Specification of Letters Patent. Patented Apr. 7, 1914.

No Drawing. Application filed October 3, 1908. Serial No. 455,958.

*To all whom it may concern:*

Be it known that I, JOHN A. SCHARWATH, a citizen of the United States, and a resident of Cranford, in the county of Union and State of New Jersey, have invented a new and Improved Process of Producing Heat - Insulating Material, of which the following is a full, clear, and exact description.

This invention has reference to improvements in processes of producing heat insulating materials, the same involving the use of alkaline silicates alone, also in combination with other materials hereinafter described, the resulting product being a material possessing marked advantages over such materials as hitherto produced, in non-conducting efficiency, light weight, strength, great resistance to the effects of heat, and insolubility in water.

The material made in accordance with my invention consists of any of the various grades of silicate of soda or potash either as single or double silicates, which, in the process of manufacture, are introduced into molds open at the top and of such form as to produce the finished material in the shapes required for its application to curved, flat or other shaped surfaces. The molds are placed in an open-top oven and the alkaline silicate subjected to heat at temperatures ranging upward from 400° Fahrenheit, and while in a viscous state agitated by any suitable means in order to break up the heavy crust which forms on heating, and permit the uniform and constant escape of the moisture in the material, the effect of which agitation also is to break up and prevent the formation of large bubbles and cavities in order that the resultant finished product will be a close grained crystalline and porous solid of approximately uniform cellular or interstitial construction. The result of the foregoing process is a body of uniform structure throughout having minute interstices in which, if the process be properly carried out, no single interstice will exceed in linear diagonal measurement one-half of an inch. Such a structure gives the best results in non-conducting efficiency, as it is a well known fact that in a given volume of large or small air cells the smaller air cells prove the best retardants to the passage of heat therethrough. In order to increase the already good crushing strength of my material when made solely from alkaline silicates, also in order to reduce its sharpness, make it better resist the heat incident to high steam pressures, and, further, make it insoluble in water and proof against acids, to vary its porosity and consequently its non-conducting efficiency from the minimum to the maximum range, I mix with the alkaline silicates a minor portion of one or more of the following materials, according to the results I desire to accomplish: carbonate of magnesia, oxid of magnesia, infusorial earth, chlorid of calcium, or any of the various compounds of metallic and non-metallic elements. I may also employ a small quantity of asbestos fiber or other suitable material as a bond, although a bond is not essential, as the material ordinarily possesses sufficient strength for all purposes without the use of a bond or other reinforcing matter. I may also, when desired, use a suitable fabric or other coating to meet special conditions of water or fire proofing. After the moisture has been evaporated and the material formed, I remove the material from the molds by cutting it out, ordinarily with a band saw especially arranged to remove the necessary shapes for its proper application to the surfaces to be insulated. The material may also be easily detached from the molds by coating the surface of the latter with graphite or a composition of graphite and lining it with a fabric or other interposed material. The material is not only adapted as an insulator of relatively high and low temperatures but may also be used with advantage as a fire retardant, sound deadener and many other special applications.

I am aware that prior to my invention alkaline silicates have been used in the production of a non-conducting material, such, for example, as disclosed in the patent to Kelly, Number 283,789, wherein a cellular material is produced by the heating of silicate of soda, but I do claim as a distinctive feature of my material that by reason of the particular method employed in heating it in the molds open to the atmosphere, thus permitting of the free escape of the heated moisture, and by agitation of the material during the heating, I produce a material of approximately uniform minute porosity or interstitial construction, which is superior in many respects to such a material having large cavities, not only as regards strength but also for the reason that a given bulk of minute air cells is a better insulator than an equal bulk of air cells whose dimensions are not approximately uniform and vary from the minute void, as is the case when prepared in accordance with the above patent.

Having thus described my invention, I claim as new and desire to secure by Letters Patent:

1. The herein described process of making a heat insulating material which consists in heating in the open, a mass primarily composed of alkaline silicates, and agitating the mass during the heating.

2. The herein described process of making a heat insulating material, which consists in heating in an open oven a mass primarily composed of alkaline silicates and agitating the mass, and removing the crust formation thereon during the heating period until an interstitial solid is produced.

3. The herein described process of making a heat insulating material which consists in heating in an open mold, having the shape required for the finished product, a mass primarily composed of alkaline silicates and agitating the mass during the heating, until a uniform interstitial solid is produced, and in then removing the product.

In testimony whereof I have signed my name to this specification in the presence of two subscribing witnesses.

JOHN A. SCHARWATH.

Witnesses:
W. W. HOLT,
JOHN P. DAVIS.